United States Patent [19]

Peake et al.

[11] Patent Number: 5,237,856
[45] Date of Patent: Aug. 24, 1993

[54] BUBBLE EMISSION VOLUME QUANTIFIER

[75] Inventors: Don A. Peake, Mt. Clemens; Brian M. Weymouth, Marysville, both of Mich.

[73] Assignee: Expertek, Inc., Detroit, Mich.

[21] Appl. No.: 718,546

[22] Filed: Jun. 20, 1991

[51] Int. Cl.[5] .............................................. G01M 3/06
[52] U.S. Cl. ................................................... 73/45.5
[58] Field of Search ................... 73/45.5, 41.2, 41.3, 73/41.4

[56] References Cited

U.S. PATENT DOCUMENTS

| | | | |
|---|---|---|---|
| 3,248,941 | 5/1966 | McArthur | 73/861.05 |
| 3,277,707 | 10/1966 | Rodel | 73/361.05 |
| 3,308,660 | 3/1967 | De'Ford | 73/40 X |
| 3,323,362 | 6/1967 | Wells | 73/861.05 |
| 3,403,555 | 10/1968 | Versaci et al. | 73/861.05 |
| 3,592,057 | 7/1971 | Boe et al. | 73/861.05 |
| 3,693,436 | 9/1972 | Gildner | 73/861.05 |
| 3,815,414 | 7/1974 | Hellstrom | 73/861.05 |
| 4,691,577 | 9/1987 | Lalin et al. | 73/861.05 |
| 4,762,004 | 8/1988 | Lalin et al. | 73/861.05 |
| 4,791,805 | 12/1988 | Gates | 73/40.7 |
| 4,854,158 | 8/1989 | Gates | 73/45.5 |
| 4,862,731 | 9/1989 | Gates | 73/40.7 |
| 4,879,907 | 11/1989 | Patterson et al. | 73/861.05 |
| 4,903,524 | 2/1990 | Kataoka et al. | 73/45.5 |
| 4,924,694 | 5/1990 | Gates | 73/45.5 |

FOREIGN PATENT DOCUMENTS

| | | | |
|---|---|---|---|
| 0421858 | 4/1991 | European Pat. Off. | 73/45.5 |
| 143823 | 4/1902 | Fed. Rep. of Germany . | |
| 831610 | 2/1952 | Fed. Rep. of Germany . | |
| 3739166 | 6/1989 | Fed. Rep. of Germany | 73/45.5 |
| 3922314 | 1/1991 | Fed. Rep. of Germany | 73/45.5 |
| 56-40717 | 4/1981 | Japan . | |
| 17335 | 2/1983 | Japan | 73/45.5 |
| 123439 | 7/1983 | Japan | 73/45.5 |
| 145430 | 7/1986 | Japan | 73/45.5 |
| 977967 | 11/1982 | U.S.S.R. | 73/45.5 |
| 1417161 | 12/1975 | United Kingdom . | |
| 2092742 | 8/1982 | United Kingdom . | |

*Primary Examiner*—Hezron E. Williams
*Assistant Examiner*—Joseph W. Roskos
*Attorney, Agent, or Firm*—Dinnin & Dunn

[57] ABSTRACT

The present invention is an apparatus and method for detecting a leak from an object. A bubble collecting tube is used for collecting bubbles emitted from an object and a bubble detecting assembly adjacent the bubble collecting tube is used for detecting a predetermined volume of bubbles collected in the bubble collecting tube to indicate a leak in the object.

20 Claims, 2 Drawing Sheets

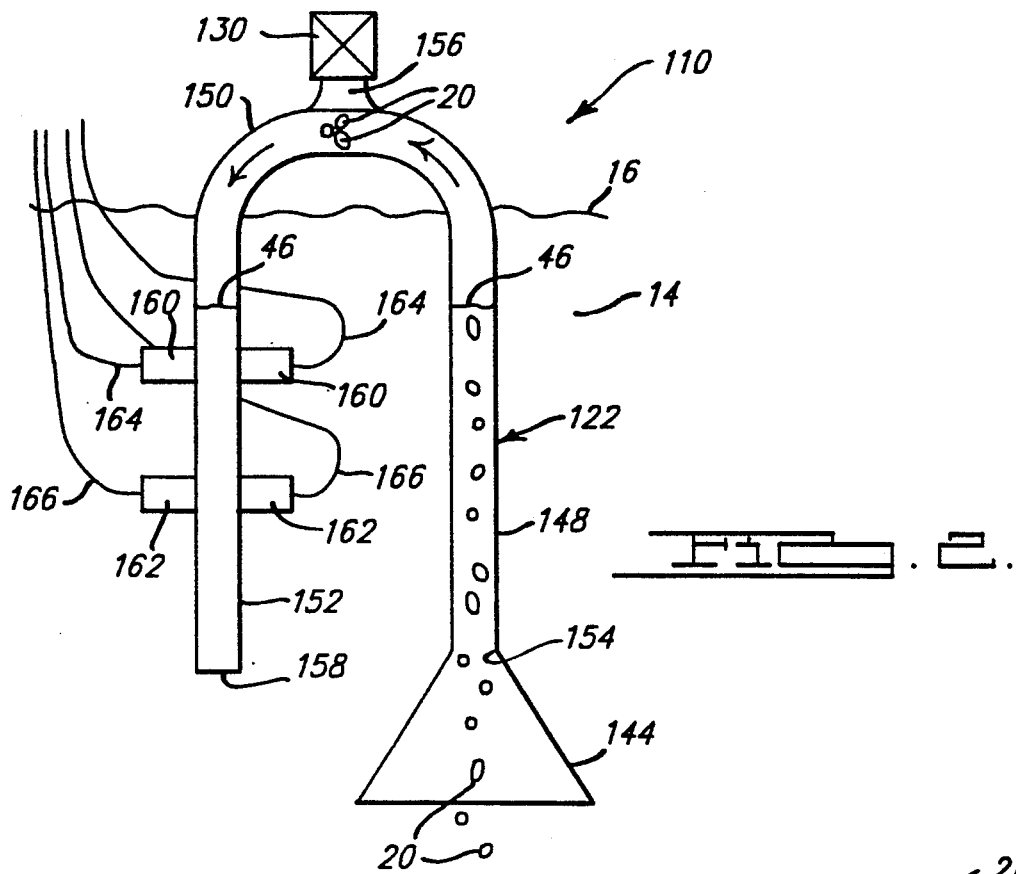
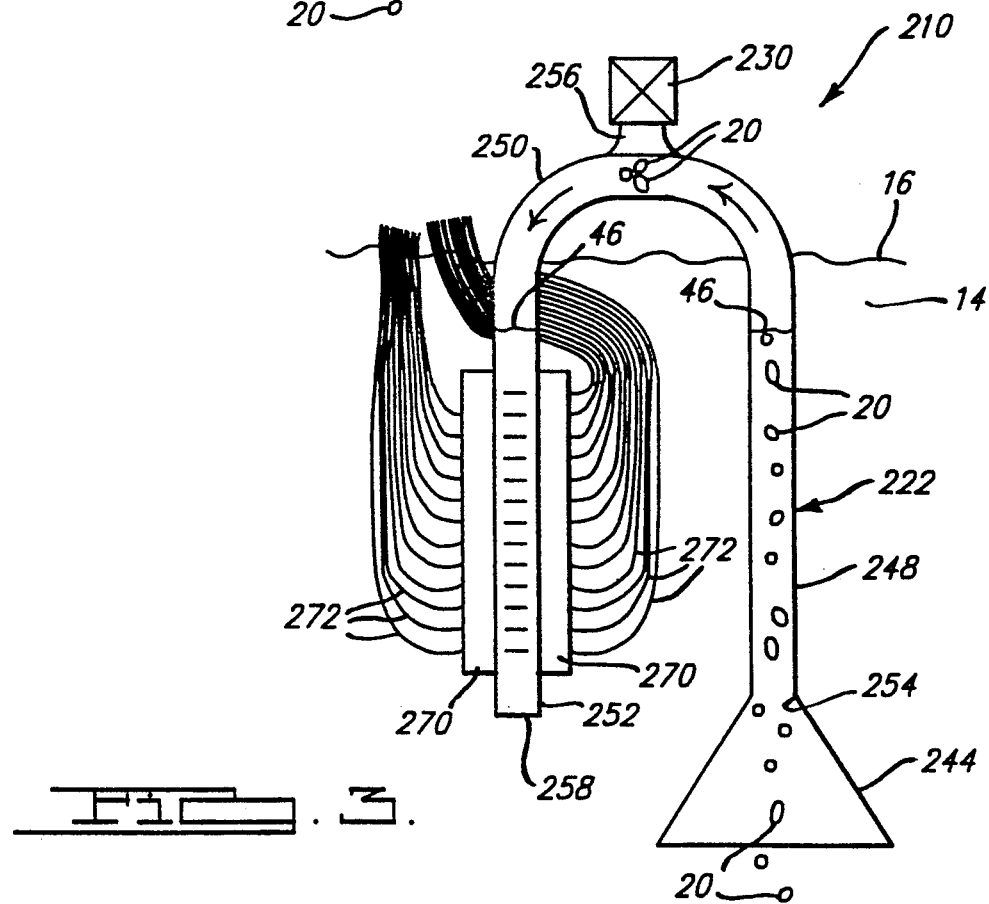

BUBBLE EMISSION VOLUME QUANTIFIER

BACKGROUND OF THE INVENTION

1. Field of the Invention

The present invention relates generally to leak detection and, more particularly, to an apparatus and method for detecting leaks based on a volume of bubbles emitted from an object.

2. Description of Related Art

Numerous components are manufactured which must meet a standard for a "leak tightness". Leak tightness is a relative term, as nothing can ever be completely free of leakage. A balance must be made between the increasing cost of finding smaller and smaller leaks and their importance to the functioning of the component over its useful life. Leak tightness is the practical leakage that is acceptable under normal operating circumstances.

Components which require some degree of leak tightness, for example, include fuel tanks, radiators, fuel systems, water pumps, wheels, refrigeration systems, heater cores, torque convertors, hydraulic and pneumatic systems, etc. The acceptable leakage will depend upon the usage of the component with respect to the type of fluid which must be contained, i.e. a gas or a liquid, and whether or not the contents will be pressurized.

There are many devices available to test for the presence of a leak. One method is mass spectroscopy where a high vacuum is drawn around the component and a test gas (helium) is introduced into the component. A spectrometer is used to scan the vacuum space for the presence of helium. Another "test gas" leak detection method is described in U.S. Pat. No. 4,862,731, in which the vacuum exhaust is run past a test gas sensor. It is extremely difficult to quantify a leak using a test gas method of detection because of the difficulty in measuring the amount of trace gas emitted through the leak. Another method of leak detection is air pressure decay where a leak will reduce the vacuum in or surrounding the component tested. While this method does provide a measure of leak quantification, the air pressure decay is time consuming and not well suited for small leaks.

A long-used leak detection technology is the bubble detection method in which a component is submerged in a liquid such as water and bubbles emerging from the component indicate a leak. Improvements on this bubble detection method are shown in U.S. Pat. Nos. 3,590,256; 4,854,158; 4,924,694 and 4,903,524.

While these various devices can identify a "leak" by detecting the passage of one or more bubbles through a given area, and can even count the bubbles passing, none can accurately quantify the volume of the bubbles over time and thus the size of the leak.

Several leak quantifying apparatuses and methods are commonly used in industry. An example of one such leak quantifying apparatus and method is disclosed in U.S. Pat. No. 4,879,907 to Patterson et al. This patented apparatus is a soap film flowmeter which may be used to measure the flow rate of gas leaking from an object over a period of time. The patented flowmeter includes an inverted U-shaped gas flow tube adjustably mounted in a sensor assembly. The flowmeter measures the flow rate of the gas leak by admitting the gas into an inlet of the gas flow tube, introducing a soap film into the interior of the gas flow tube in a region adjacent the inlet, and permitting the entering gas to propel the soap film within the tube past a sensing region. The sensing region measures the elapsed time of the soap film past a pair of detectors and displays the result as a flow rate of the gas leak.

One problem of the above-patented flowmeter is that the flow rate of individual bubbles is measured to detect a leak. This is undesirable because the flow rate may vary between individual bubbles. Another problem of the patented flowmeter is that the volume of bubbles emitted from an object cannot be quantified. Yet another problem of the patented flowmeter is that a soap film is required to measure the flow rate of the gas leak. This is also undesirable because soap films are messy and must be continually supplied.

SUMMARY OF THE INVENTION

It is, therefore, one object of the present invention to provide an apparatus and method for detecting a leak by measuring a volume of bubbles emitted from an object.

It is another object of the present invention to quantify the volume of bubbles emitted from an object.

It is a further object of the present invention to provide a new and improved leak detection apparatus and method.

To achieve the foregoing objects, the present invention is an apparatus for detecting a leak from an object. The apparatus includes bubble collecting means for collecting bubbles emitted from the object and bubble detecting means adjacent the bubble collecting means for detecting a predetermined volume of bubbles collected to indicate a leak in the object.

The present invention is also a method for detecting a leak from an object. The method includes the steps of collecting bubbles emitted from an object in a bubble collecting means. The steps further include detecting a volume of bubbles collected with a bubble detecting means adjacent the bubble collecting means to indicate a leak in the object.

One advantage of the present invention is that a volume of bubbles emitted from an object is collected and measured to detect a leak rather than a flow rate of individual bubbles. Another advantage of the present invention is that the volume of bubbles emitted from the object can be quantified. Still another advantage of the present invention is that actual leak rates of objects can be determined by measuring the bubbles collected over time. A further advantage of the present invention is that it can be automatic or portable.

Other objects, features and advantages of the present invention will be readily appreciated as the same becomes better understood after reading the following description in light of the accompanying drawings.

BRIEF DESCRIPTION OF THE DRAWINGS

FIG. 2 is an elevational schematic view of a first alternate embodiment of the apparatus of FIG. 1.

FIG. 3 is an elevational schematic view of a second alternate embodiment of the apparatus of FIG. 1.

DESCRIPTION OF THE PREFERRED EMBODIMENT(S)

Figure 1:
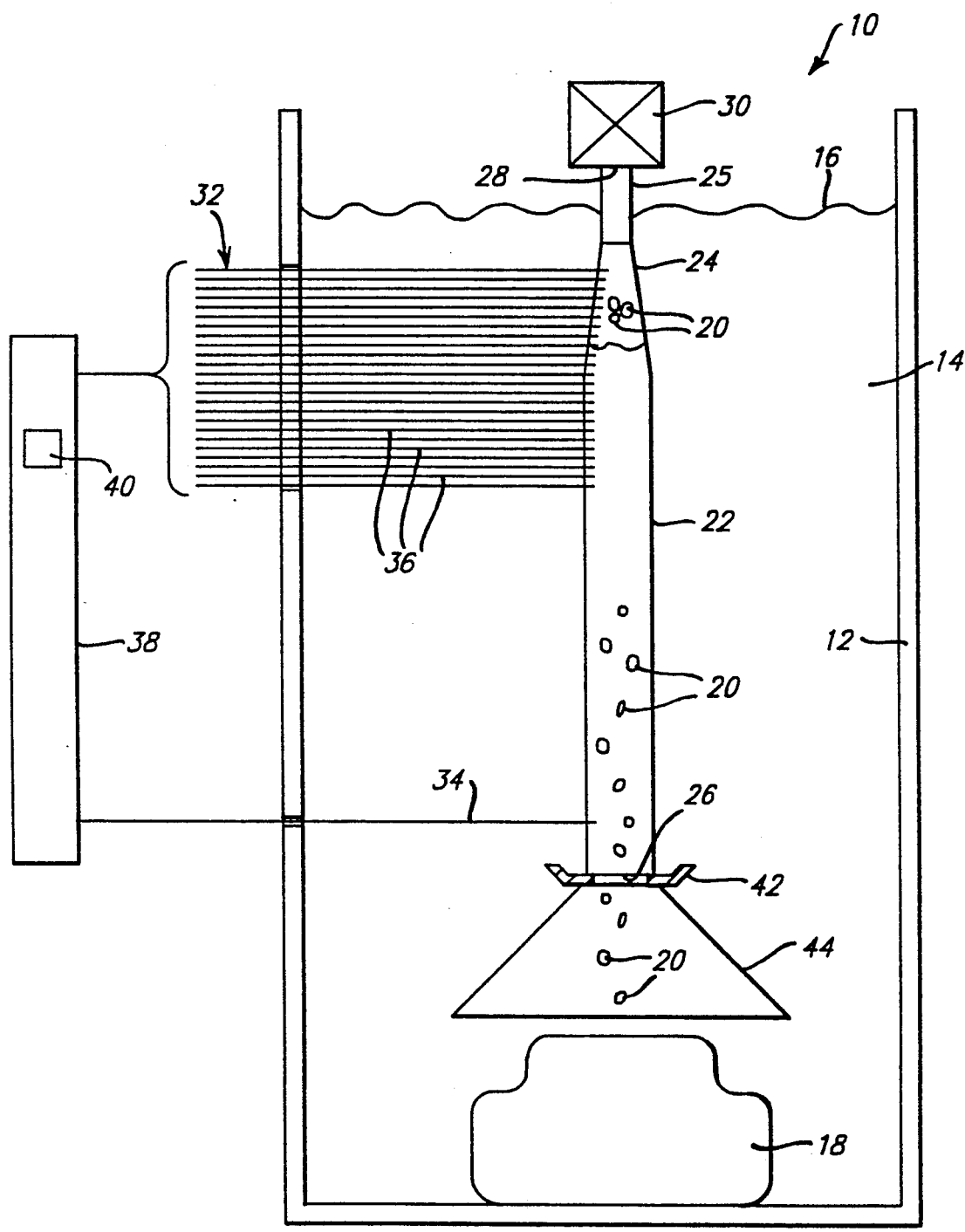
FIG. 1 is an elevational schematic view of a bubble emission volume quantifier apparatus according to the present invention.

Referring to FIG. 1, a bubble emission volume quantifier apparatus 10 according to the present invention is shown. The apparatus 10 is adapted for use in a holding tank 12 which contains a quantity of fluid 14 such as water having a level at 16. The apparatus 10 detects a leak in an object 18 such as a fuel tank by measuring a volume of bubbles 20 emitted from the object 18. It should be appreciated that the bubbles 20 are emitted when the object 18 is submerged in the fluid 14 below the level 16. It should also be appreciated that suitable means may be provided to lower and raise the object 18 into and out of the fluid 14 in the holding tank 12 as disclosed in U.S. Pat. No. 4,924,694, the disclosure of which is hereby incorporated by reference.

The apparatus 10 includes a flow capturing or bubble collecting tube 22 for collecting the bubbles 20 emitted from the object 18. The bubble collecting tube 22 is a generally elongated and linear tube having a tapered or frustoconical portion 24 to a reduced diameter portion 25 at one end. The bubble collecting tube 22 has an inlet 26 at the end opposite the reduced diameter portion 25 and an outlet 28 at the end of the reduced diameter portion 25. Preferably, the bubble collecting tube 22 is made of a transparent material such as glass or clear plastic. It should be appreciated that the bubble collecting tube 22 may be made of any suitable material such as plastic.

The apparatus 10 also includes a purge valve 30 at the outlet 28 to purge gas such as air from the bubble collecting tube 22. The purge valve 30 is conventional and may be manually or automatically operated. It should be appreciated that the bubble collecting tube 22 is disposed within the fluid 14 and the purge valve 30 remains above the level 16 of the fluid 14. It should also be appreciated that the purge valve 30 purges the gas to atmosphere.

The apparatus 10 further includes a bubble detecting assembly, generally indicated at 32, adjacent the bubble collecting tube 22 for detecting a predetermined volume of bubbles 20 collected in the bubble collecting tube 22 to indicate a leak in the object 18. The bubble detecting assembly 32 includes a first pick-up probe or wire 34 extending through the bubble collecting tube 22 and into the interior thereof near the inlet 26. The bubble detecting assembly 32 also includes, at least one, preferably a plurality of second pick-up probes or wires 36 extending through the bubble collecting tube 22 and into the interior thereof a predetermined distance from the outlet 28. Preferably, the second pick-up wires 36 are spaced equally along the bubble collecting tube 28 from each other. Each second pick-up wire 36 is located at a predetermined distance from the outlet 28 and represents a predetermined volume of the bubble collecting tube 22. The first and second pick-up wires 34 and 36 are made of a non-corroding material. Preferably, the first and second pick-up wires 34 and 36 are made of a metal material which is gold plated.

The bubble detecting assembly 32 further includes a controller 38 electrically connected to the first and second pick-up wires 34 and 36, respectively. The controller 38 is connected to or may include a source of power (not shown) such as a low voltage direct current (D.C.) power source. The controller 38 provides a positive electrical charge or voltage to the first pick-up wire 34 and a negative electrical charge or voltage to the second pick-up wires 36. When the bubble collecting tube 22 is disposed in the fluid 14 a sufficient distance below the level 16, fluid fills the interior of the bubble collecting tube 22 between the first and second pick-up wires 34 and 36 and acts as an electrical conducting medium. As a result, a low voltage current flows from the first pick-up wire 34 through the fluid 14 to the second pick-up wires 36. It should be appreciated that the controller 38 may be connected to an alternating current (A.C.) power source and have a transformer for converting the A.C. to D.C. It should also be appreciated that the controller 38 may be connected to the purge valve 30 to control the opening and closing of the purge valve 30.

The controller 38 may include a display 40 such as L.E.D. lights, L.E.D. displays or analog outputs. The controller 38 may also be programmable for automatic sequencing of the method to be described. The controller 38 may further include a clock (not shown) to provide and measure time periods. Such a controller 38 may be of a type 80C31 microprocessor commercially available from Intel Corporation. It should be appreciated that the controller 38 may display the flow rate of the volume of bubbles collected through calculating parameters programmable into the controller 38. Similarly, since a vacuum may be drawn over the water surface or pressurized air injected into the object 18, the controller 38 may determine a relative volume or flow and calculate or convert to an absolute or comparative figure.

The apparatus 10 may include a diverter 42 adjacent the inlet 26 of the bubble collecting tube 22. The diverter 42 is used to divert bubbles 20 away from the inlet 26 of the bubble collecting tube 22 until a predetermined time to reduce bubble adhesion to interior surfaces of the bubble collecting tube 22. The diverter 42 is a stand-by diverter which is moveable to open and close the inlet 26 of the bubble collecting tube 22. It should be appreciated that suitable means may be provided to support and/or move the diverter 42.

The apparatus 10 may further include a channeling device 44 adjacent the inlet 26 of the bubble collecting tube 22 to guide or channel bubbles 20 into the inlet 26. The channeling device 44 is preferably funnel or frustoconically shaped. The channeling device 44 may be integral with the bubble collecting tube 22 or attached thereto. It should be appreciated that suitable means may be provided to support the channeling device 44 below the inlet 26 of the bubble collecting tube 22. It should also be appreciated that the diverter 42 and channeling device 44 may be optional.

Accordingly, the present invention provides a method of operation for detecting a leak in the object 18. In operation, the object 18 is submerged in the holding tank 12 below the level 16 of the fluid 14. The bubble collecting tube 22 is also submerged in the fluid 14 a sufficient distance such that the second pick-up wires 36 are disposed below the level 16 of the fluid 14. The purge valve 30 is actuated to purge any gas from the bubble collecting tube 22 such that fluid 14 fills the interior of the tube 22 and has a barrier or surface 46 at the same level as level 16 of the fluid 14. The inlet 26 of the bubble collecting tube 22 is disposed above the object 18 and over the location where bubbles 20 are being emitted. It should be appreciated that the barrier 46 is originally at a predetermined distance from the outlet 28 to provide a predetermined volume of gas within the tube 28.

When desired or at the beginning of a time period, the diverter 42 is moved to open the inlet 26 to the bubbles 20 emitted from the object 18. The bubbles 20 enter the bubble collecting tube 22 through the inlet 26 and collect near the outlet 28. As the bubbles are collected or accumulated, the volume formed pushes fluid 14 from the bubble collecting tube 22 through the inlet 26. As a result, the barrier 46 of the fluid 14 in the bubble collecting tube 22 moves toward the inlet 26. When the barrier 46 moves below a second pick-up wire 36, negative voltage or current flow to that pick-up wire 36 is interrupted. As a result, the controller 38 displays readings on the display 40 which may correspond either to the volume of bubbles 20 collected or, if time has been measured, the leak rate of the object 18 in terms of volume of bubbles collected over time. It should be appreciated that the original volume of gas within the bubble collecting tube 22 after purging is factored into the displayed readings.

Referring to FIG. 2, a first alternate embodiment 110 of the apparatus 10 of FIG. 1 is shown. Like parts of the apparatus 10 have like numerals increased by one hundred (100). The apparatus 110 has a bubble collecting tube, generally indicated at 122, with a generally inverted U-shape. The bubble collecting tube 122 has an entry portion 148 connected to a bend portion 150 which, in turn, is connected to a detection portion 152. The entry portion 148 has an inlet 154 and a channeling device 144 connected at the inlet 154. Preferably, the channeling device 144 is integral with the entry portion 148. The bend portion 150 has a purge port 156 at an apex thereof. The purge valve 130 is connected to the bend portion 150 at the purge port 156. The purge valve 130 operates similar to the purge valve 30. The detection portion 152 has an outlet 158 at one end thereof. The entry portion 148, bend portion 150 and detection portion 152 are integral and preferably of the same diameter.

The bubble detecting assembly 132 is adjacent the detection portion 152 of the bubble collecting tube 122. The bubble detecting assembly 132 includes a plurality, preferably a pair of first sensors 160 and second sensors 162 disposed longitudinally along the detection portion 152. The first sensors 160 are spaced longitudinally from the second sensors 162 along the detection portion 152. The first and second sensors 160 and 162 are, preferably fiber optic connectors, connected to fiber optic cables 164 and 166, respectively. The sensors 160 and 162 receive light from light sources (not shown) which is transmitted through the cables 164 and 166. The cables 164 and 166 are connected at their other ends to photocells or photodiodes (not shown) in the controller 38 which convert the light to an electrical signal. The first and second sensors 160 and 162 are disposed on the detection portion 152 to eliminate false signals from foaming which may occur on the entry portion 148 when bubbles 20 are collected.

In operation, the bubble collecting tube 122 is submerged in the fluid 14 a sufficient distance such that the first and second sensors 160 and 162 are disposed below the level 16 of the fluid 14. The purge valve 130 is actuated to purge gas from the bubble collecting tube 122 to atmosphere such that fluid 14 fills the interior of the bubble collecting tube 122 and has a barrier 46 in the entry portion 148 and detection portion 152 at the same level as level 16 of the fluid 14.

When desired or at the beginning of a time period, bubbles 20 enter the bubble collecting tube 122 through the channeling device 144 and inlet 154 and collect in the bend portion 150. As the bubbles are collected or accumulated, the volume formed pushes fluid 14 from the bubble collecting tube 122 through the inlet 154 and outlet 158. As a result, both barriers 46 of the fluid 14 in the bubble collecting tube 122 move toward the inlet 154 and outlet 158. Since the tube 122 is closed to the atmosphere, the air pressure in the bend portion 150 will increase as bubbles are collected, lowering each barrier 46 equally. In this embodiment, only half of the bubble volume is actually measured, which is included in volumetric or flow calculations. When the barrier 46 on the detection portion 152 moves below the first sensors 160, the light transmission to the first sensors 160 is interrupted. This causes an interruption in the signal from the photodiodes which is detected by the controller 38. In this embodiment, the first sensors 160 act as an acceptable trip point for leak detection. As the bubbles 20 continue to collect, the barrier 46 on the detection portion 152 moves below the second sensors 162 which operate similar to the first sensors 160. The second sensors 162 act as a reject trip point for leak detection. Thus, if the bubbles 20 collected from the object 18 trip the second sensors 162, the object 18 will be rejected as having undesired leakage.

Referring to FIG. 3, a second alternate embodiment 210 of the apparatus 10 of FIG. 1 is shown. Like parts have like numerals increased by two hundred (200). The apparatus 210 has a bubble collecting tube 222 which is similar to the bubble collecting tube 122 of FIG. 2 and like parts are increased by one hundred (100). In the apparatus 210, the first and second sensors 160 and 162 are replaced by a plurality of sensors 270 disposed along the detection portion 252. Preferably, the sensors 270 are pairs of fiber optic connectors connected to fiber optic cables 272 and operate similar to sensors 160 and 162. Each pair of fiber optic connectors are spaced equally along the detection portion 252 from each other and represent a predetermined volume of the bubble collecting tube 222. The apparatus 210 operates similar to apparatus 110. It should be appreciated that suitable means are provided for mounting the sensors 270 to the bubble collecting tube 222. It should also be appreciated that when each pair of sensors 270 are tripped, the controller 38 may display readings corresponding to the volume of bubbles collected or leak rate of the object 18.

Accordingly, the present invention may be automatic or a portable hand held unit. The present invention can be used to quantify leaks in various parts or a plurality of the units may be used to test a number of zones of a given part. The present invention may be used to display actual leak rates through calculating parameters programmed within the controller. One embodiment of the present invention uses low voltage D.C. power in water as the conductor. The present invention may have suitable trip points for a go/no go situation. In another embodiment, a generally U-shaped bubble collecting tube may be used with sensors on a detection portion opposite an entry portion to eliminate the effects of foaming.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An apparatus for detecting a leak from an object, comprising:

bubble collecting means for collecting bubbles escaping from the object, said bubble collecting means comprising a bubble collecting tube having an inlet for entry of bubbles into said bubble collecting tube, and including diverter means for diverting bubbles away from said inlet of said bubble collecting tube; and bubble detecting means adjacent said bubble collecting means for detecting a predetermined volume of bubbles collected to indicate a leak.

2. An apparatus for detecting a leak from an object, comprising:

bubble collecting means for collecting bubbles escaping from the object;

bubble detecting means adjacent said bubble collecting means for detecting a predetermined volume of bubbles collected to indicate a leak, said bubble collecting means having an inlet for entry of bubbles, a first probe, and a plurality of second probes spaced from said first probe and extending into an interior of said bubble collecting means.

3. An apparatus for detecting a leak from an object, comprising:

bubble collecting means for collecting bubbles escaping from the object;

bubble detecting means adjacent said bubble collecting means for detecting a predetermined volume or volumes of bubbles collected to indicate a leak, said bubble collecting means comprising a bubble collecting tube having an inlet for entry of bubbles into said bubble collecting tube, a first probe connected to said bubble collecting tube near said inlet and extending into the interior thereof, and a plurality of second probes spaced from said first probe and connected to said bubble collecting tube and extending into the interior thereof.

4. An apparatus as set forth in claim 3 including means for applying a positive electrical voltage to said first probe and a negative electrical voltage so said second probes, whereby the volume of bubbles collected interrupts the voltage applied when fluid adapted to be disposed in said bubble collecting tube does not contact said first and second probes.

5. An apparatus as set forth in claim 3 including means for applying a current between said first and second probes through a liquid contained in said apparatus whereby the volume of bubble collected interrupts said current flow between said first and second probes.

6. An apparatus for detecting a leak from an object, comprising:

a bubble collecting tube having a generally inverted U-Shape for collecting bubbles escaping from the object;

bubble detecting means adjacent said bubble collecting means for detecting a predetermined volume of bubbles collected to indicate a leak, comprising a pair of first sensors connected to said bubble collecting tube with a light beam emitted therebetween, and a pair of second sensors spaced from said first sensors and connected to said bubble collecting tube with a light beam emitted therebetween, whereby the volume of bubble collected diffuse the beam to form a signal.

7. An apparatus for detecting a leak from an object, comprising:

a bubble collecting tube having a generally inverted U-Shape for collecting bubbles escaping from the object;

bubble detecting means adjacent said bubble collecting means for detecting a predetermined volume of bubbles collected to indicate a leak, comprising a plurality of pairs of sensors connected to said bubble collecting tube with a light beam emitted between each pair, whereby the volume of bubble collected diffuse the beam to form a signal.

8. An apparatus for detecting a leak from an object, comprising:

bubble collecting means for collecting bubbles escaping from the object;

bubble detecting means adjacent said bubble collecting means for detecting a predetermined volume of bubbles collected to indicate a leak, said bubble collecting means comprising a bubble collecting tube having a generally inverted U-Shape and including purge means for purging gas from said bubble collecting tube.

9. An apparatus as set forth in claim 8 wherein said purge means comprises a purge valve connected to an apex of said bubble collecting tube.

10. An apparatus for detecting a leak from an object, comprising:

a bubble collecting tube for collecting bubbles emitted from an object;

a bubble detecting assembly adjacent said bubble collecting tube for detecting a predetermined volume of bubbles collected to indicate a leak;

said bubble detecting assembly comprising a first probe and at least one second probe spaced from said first probe, said first and second probes being connected to said bubble collecting tube and extending into an interior thereof.

11. An apparatus as set forth in claim 10 including means for applying a positive electrical voltage to one of said first and second probes and for applying a negative electrical voltage to the other of said first and second probes.

12. An apparatus as set forth in claim 10 including means for submerging the bubble collecting means in a fluid above the object submerged within the fluid.

13. An apparatus as set forth in claim 12 including means for purging any gases from the bubble collecting means prior to collecting bubbles emitted from the object.

14. An apparatus as set forth in claim 13 including means for locating an inlet of the bubble collecting means over the location where bubbles are being emitted.

15. An apparatus as set forth in claim 10 including means for applying a current between said first and second probes through a liquid contained in said apparatus whereby the volume of bubble collected interrupts said current flow between said first and second probes.

16. An apparatus for detecting a leak from an object, comprising:

a bubble collecting tube for collecting bubbles emitted from an object;

a bubble detecting assembly adjacent said bubble collecting tube for detecting a predetermined volume of bubbles collected to indicate a leak;

said bubble detecting assembly comprising a pair of first sensors connected to said bubble collecting tube with a light beam emitted therebetween, and a pair of second sensors spaced from said first sensors and connected to said bubble collecting tube with a light beam emitted therebetween, whereby the volume of bubble collected diffuse the beam to form a signal.

17. An apparatus for detecting a leak from an object, comprising:
- a bubble collecting tube for collecting bubbles emitted from an object;
- a bubble detecting assembly adjacent said bubble collecting tube for detecting a predetermined volume of bubbles collected to indicate a leak;
- said bubble detecting assembly comprising a plurality of pairs of sensors connected to said bubble collecting tube with a light beam emitted between each pair, whereby the volume of bubble collected diffuse the beam of each pair of sensors to form a signal.

18. A method for detecting a leak from an object, comprising the steps of:
- submerging and holding by hand the bubble collecting tube in a fluid above an object submerged within the fluid;
- locating an inlet of the bubble collecting tube over the location where bubbles are being emitted;
- collecting bubbles emitted from the object in the bubble collecting tube; and
- detecting a volume of bubbles collected with a bubble detecting assembly adjacent the bubble collecting tube to indicate a leak in the object.

19. The method as set forth in claim 18 further comprising the step of pressurizing said object with air.

20. A bubble emission volume quantifier apparatus, comprising:
- a holding tank adapted for holding a liquid at a predetermined level;
- a bubble collecting tube having a generally inverted U-shape disposed in the fluid above an object submerged within the fluid;
- said bubble collecting tube having an inlet disposed over the location where bubbles are being emitted from the object;
- a purge valve connected to said bubble collecting tube to purge gas from said bubble collecting tube prior to collecting bubbles emitted from the object; and
- a bubble detecting assembly adjacent said bubble collecting tube for detecting a predetermined volume of bubbles collected to indicate a leak.

* * * * *